US010127201B2

United States Patent
Dettman et al.

(10) Patent No.: US 10,127,201 B2
(45) Date of Patent: *Nov. 13, 2018

(54) NATURAL LANGUAGE PROCESSING—ASSISTED EXTRACT, TRANSFORM, AND LOAD TECHNIQUES

(71) Applicant: International Business Machines Corporation, Armonk, NY (US)

(72) Inventors: Elizabeth T. Dettman, Rochester, MN (US); Joel C. Dubbels, Rochester, MN (US); Andrew R. Freed, Cary, NC (US); Michael T. Payne, Rochester, MN (US); Michael W. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/691,905

(22) Filed: Apr. 21, 2015

(65) Prior Publication Data

US 2016/0117293 A1    Apr. 28, 2016

Related U.S. Application Data

(63) Continuation of application No. 14/522,397, filed on Oct. 23, 2014.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/211* (2013.01); *G06F 17/2264* (2013.01);
(Continued)

(58) Field of Classification Search
CPC ............ G06F 17/2785; G06F 17/2705; G06F 17/30569; G06F 17/2264; G06F 17/2247
See application file for complete search history.

(56) References Cited

U.S. PATENT DOCUMENTS 6,076,088 A * 6/2000 Paik .................. G06F 17/30707
6,263,335 B1 * 7/2001 Paik .................. G06F 17/30707
(Continued)

OTHER PUBLICATIONS

Bozovic et al.,"Two-Phase Schema Matching in Real World Relational Databases," © 2008, IEEE, pp. 290-296.*
(Continued)

*Primary Examiner* — Cesar Paula
*Assistant Examiner* — James H Blackwell
(74) *Attorney, Agent, or Firm* — Patterson + Sheridan, LLP (57) ABSTRACT

Embodiments presented herein disclose techniques for transforming input documents having disparate formats into a normalized format (e.g., Atom, RSS, HTML, customized XML, etc.). According to one embodiment, a plurality of fields is identified in an input document that has a given format. Each field includes a descriptor and text content associated with the descriptor. For each field, semantic properties are evaluated for the descriptor and text content against a plurality of mapping rules to determine whether the field is consistent with one of a plurality of fields of a target format. Each mapping rule specifies characteristics associated with one of the fields in the target format. Once so determined, a mapping from the first field to the second field is defined.

4 Claims, 6 Drawing Sheets

(51) Int. Cl.
*G06F 17/27* (2006.01)
*G06F 17/30* (2006.01)
*G06F 17/21* (2006.01)

(52) U.S. Cl.
CPC .... *G06F 17/2785* (2013.01); *G06F 17/30563* (2013.01); *G06F 17/30569* (2013.01)

(56) References Cited

U.S. PATENT DOCUMENTS

| | | | |
|---|---|---|---|
| 6,839,714 B2 | 1/2005 | Wheeler et al. | |
| 6,851,087 B1 | 2/2005 | Sibert | |
| 7,051,334 B1* | 5/2006 | Porter | H04L 12/66 709/201 |
| 7,152,074 B2* | 12/2006 | Dettinger | G06F 17/30569 707/810 |
| 7,155,427 B1 | 12/2006 | Prothia et al. | |
| 7,483,924 B2* | 1/2009 | Cohen | G06F 17/2264 |
| 7,962,937 B2 | 6/2011 | Cho et al. | |
| 8,751,936 B2 | 6/2014 | Gandhi et al. | |
| 8,898,798 B2* | 11/2014 | Rogers | G06F 19/32 726/26 |
| 8,996,555 B2* | 3/2015 | Kuchmann-Beauger | G06F 17/30389 707/763 |
| 9,443,005 B2* | 9/2016 | Khandekar | G06F 17/30654 |
| 2002/0055932 A1 | 5/2002 | Wheeler et al. | |
| 2002/0147747 A1 | 10/2002 | Zaharkin | |
| 2003/0023604 A1* | 1/2003 | O'Brien | G06Q 30/06 |
| 2003/0093576 A1* | 5/2003 | Dettinger | G06F 9/546 719/313 |
| 2004/0107189 A1 | 6/2004 | Burdick et al. | |
| 2005/0065952 A1* | 3/2005 | Dettinger | G06F 17/30569 |
| 2006/0161840 A1* | 7/2006 | Cohen | G06F 17/2264 715/234 |
| 2007/0033290 A1 | 2/2007 | Valen et al. | |
| 2007/0055655 A1 | 3/2007 | Bernstein et al. | |
| 2007/0203922 A1 | 8/2007 | Thomas | |
| 2008/0021912 A1 | 1/2008 | Seligman et al. | |
| 2008/0027930 A1 | 1/2008 | Bohannon et al. | |
| 2008/0046292 A1* | 2/2008 | Myers | G06F 17/30557 705/3 |
| 2008/0281820 A1 | 11/2008 | Do et al. | |
| 2008/0307430 A1* | 12/2008 | Friedlander | G06F 19/322 719/313 |
| 2008/0313215 A1 | 12/2008 | Beker et al. | |
| 2008/0320549 A1 | 12/2008 | Bertino et al. | |
| 2009/0112916 A1 | 4/2009 | Stuhec | |
| 2011/0066626 A1 | 3/2011 | Dharmalingam | |
| 2012/0110016 A1 | 5/2012 | Phillips | |
| 2012/0124478 A1 | 5/2012 | King et al. | |
| 2013/0124523 A1* | 5/2013 | Rogers | G06F 19/32 707/737 |
| 2013/0144605 A1 | 6/2013 | Brager et al. | |
| 2014/0006012 A1* | 1/2014 | Zhou | G06F 17/30654 704/9 |
| 2014/0136961 A1 | 5/2014 | Mai et al. | |
| 2014/0149446 A1* | 5/2014 | Kuchmann-Beauger | G06F 17/30389 707/763 |
| 2014/0316768 A1* | 10/2014 | Khandekar | G06F 17/30654 704/9 |
| 2014/0317563 A1 | 10/2014 | O'Byrne | |
| 2015/0317563 A1 | 11/2015 | Baldini Soares et al. | |

OTHER PUBLICATIONS

Lally, A. et al.,"Question analysis: How Watson reads a clue," © May/Jul. 2012, IBM J. Res. & Dev. 56, No. 3/4 Paper 2, pp. 2-1 to 2-14.*

Jurafsky, D. et al.,"Chapter 28, Question Answering," © 2015, in Speech and Lanuage Processing, pp. 1-19.*

Pottenger, W. M. et al.,"Free Text Conversion and Semantic Analysis," © Aug. 2007, pp. 1-108.*

International Business Machines Corporation, "List of IBM Patents or Patent Applications Treated As Related," Feb. 17, 2016, 2 pages.

Clifton, C. et al.,"Experience with a Combined Approach to Attribute-Matching Across Heretogeneous Databases,"© 1998, IFIP, pp. 428-451.

Simitsis, A. et al.,"Natural Language Reporting for ETL Processes,"© 2008, ACM, pp. 65-72.

Madhavan, J. et al.,"Generic Schema Matching with Cupid,"© Aug. 2001, Microsoft Research, pp. 1-14.

Miller, R.J. et al.,"Schema Equivalence in Heterogeneous Systems: Bridging Theory and Practice,"© 1994, Information Systems 19(1 ):3-31, 1994 30 pages total.

Wang, Q.Y. et al.,"Approximate Graph Schema Extraction for Semi-Strutured Data,"© 2000, Springer Verlag Berlin Heidelberg, pp. 302-316.

Lam, M.I. et al.,"A Method for Web Information Extraction," Springer-Verlag Berlin Heidelberg, 2008, pp. 383-294.

Agrawal, H. et al.,"An Enhanced Extract-Transformation-Load System for Migrating Data in Telecom Billing," IEEE Xplore, May 2008 [Abstract Only] [Available Online] https://www.researchgate.net/publication/224310766_An_Enhanced_Extract-Transform-Load_System_for_Migrating_Data_in_Telecom_Billing.

Wynden, R. et al.,"Ontology Mapping and Data Discovery for the Translational Investigator,"Mar. 2010, PubMed, pp. 66-70.

Lewis, N. et al.,"Extracting Family History Diagnosis From Clinical Texts,"© Dec. 2010, 6 pages.

Simitsis, A. et al.,"Representation of conceptual ETL designs in natural language using Semantic Web technology,"Datat & Knowledge Engineering, vol. 69, Issue 1, Jan. 2010, pp. 96-115.

U.S. Appl. No. 14/522,397, entitled "Natural Language Processing—Assisted Extract, Transfor, and Load Techniques," filed Oct. 23, 2014.

Vassiliadis, P.,"A Survey of Extract-Transform-Load Technology," © Jul.-Sep. 2009, Intl. Journal of Data Warehousing and Mining, pp. 1-27.

Rahm, E. et al.,"A Survey of Approaches to Automatic Schema Matching," © 2001/ The VLDB Journal, pp. 334-350.

Agrawal, H. et al.,"An Enhanced Extract-Transformation-Load System for Migrating Data in Telecom Billing," © 2008, IEEE, pp. 1277-1286.

* cited by examiner

| Field 301 | Characteristics 302 |
|---|---|
| Atom:Author | LAT(descriptor): person; LAT(value): specific person; descriptor synonymous with author |
| Atom:Publish Date | LAT(value): date; descriptor name synonymous with create/publish |
| Atom:Title | value likely has short phrase length and high capital letter incidence |
| . . . | . . . |
| . . . | . . . |
| . . . | . . . |

NATURAL LANGUAGE PROCESSING—ASSISTED EXTRACT, TRANSFORM, AND LOAD TECHNIQUES

CROSS-REFERENCE TO RELATED APPLICATION

This application is a continuation of co-pending U.S. patent application Ser. No. 14/522,397, filed Oct. 23, 2014. The aforementioned related patent application is herein incorporated by reference in its entirety.

BACKGROUND

The present invention relates to extract, transform, and load (ETL) systems, and more specifically, to transforming arbitrary document formats into standard formats using natural language processing (NLP).

Generally, ETL systems extract data from multiple disparate sources, transform the data to fit given operational needs, and then load the data into an end target (e.g., a data store, data warehouse, etc.). Once loaded, other systems can access the data for specified purposes. For example, an analytics system can process the data and derive various metrics that may be of use for an organization. More generally, ETL systems play an important role in many fields.

For example, the medical field has a wealth of information spread across many sources. For example, research institutions publish medical papers and articles distributed to the medical community. Medical libraries archive textbooks and encyclopedias providing information about diseases, treatments, and the like. Some organizations desire to access this information to develop healthcare solutions, learning mechanisms, treatment decisions, and other beneficial techniques. One approach is to input the information (i.e., medical papers, articles, texts, etc.) into a system that uses natural language processing techniques to parse each of the structured and unstructured texts input to the system.

However, one issue with ingesting documents from multiple sources is that documents from different sources may be formatted or structured differently. That is, data exists in many unstructured, semi-structured, and structured forms. For example, some organizations may organize text files in a structured XML format, while others may organize texts using some other markup language. Although standards bodies have recommended that data be presented in a certain publishing format (e.g., RSS/Atom), many organizations have not adopted such formats. As a result, an ETL administrator must manually examine the different formats of files and determine how the texts should be formatted for the end target system. Once determined, the ETL server can reformat the texts accordingly. However, an organization may have texts in many formats. Therefore, to standardize the formats, the ETL administrator must identify each individual format provided and discern relevant fields to extract from the texts. Such an approach quickly becomes be time-consuming.

SUMMARY

One embodiment presented herein describes a method for mapping fields of an input document structured according to a first format. The method generally includes identifying a plurality of first fields in the input document. Each first field includes a descriptor and text content associated with the descriptor. For each first field, semantic properties of the descriptor and the text content are evaluated, via one or more natural language processing techniques, against a plurality of mapping rules to determine whether the first field is consistent with one of a plurality of second fields in a target format. Each mapping rule specifies characteristics associated with one of the second fields in the target format. Upon determining that the given first field is consistent with one of the second fields, a mapping is defined from the first field to the second field determined to be consistent with the first field.

Another embodiment presented herein describes a system having a processor and a memory storing a program which, when executed on the processor, performs an operation for mapping fields of an input document structured according to a first format. The operation itself generally includes identifying a plurality of first fields in the input document. Each first field includes a descriptor and text content associated with the descriptor. For each first field, semantic properties of the descriptor and the text content are evaluated, via one or more natural language processing techniques, against a plurality of mapping rules to determine whether the first field is consistent with one of a plurality of second fields in a target format. Each mapping rule specifies characteristics associated with one of the second fields in the target format. Upon determining that the given first field is consistent with one of the second fields, a mapping is defined from the first field to the second field determined to be consistent with the first field.

Another embodiment presented herein describes a computer program product having computer-readable program code configured to perform an operation for mapping fields of an input document structured according to a first format. The operation itself generally includes identifying a plurality of first fields in the input document. Each first field includes a descriptor and text content associated with the descriptor. For each first field, semantic properties of the descriptor and the text content are evaluated, via one or more natural language processing techniques, against a plurality of mapping rules to determine whether the first field is consistent with one of a plurality of second fields in a target format. Each mapping rule specifies characteristics associated with one of the second fields in the target format. Upon determining that the given first field is consistent with one of the second fields, a mapping is defined from the first field to the second field determined to be consistent with the first field.

DETAILED DESCRIPTION

Embodiments presented herein describe techniques for transforming distinct formats of input documents into a target format using natural language processing (NLP) techniques. In one embodiment, an extract, transform, and load (ETL) server receives one or more documents to ingest into a computer system. The documents may be structured, unstructured, or semi-structured. For instance, some documents may be formatted based on different Extensible Markup Language (XML) schemas. Other documents may be composed using other formats or simply provide unformatted text. Therefore, content may be organized differently across the multiple documents. For example, an field used to identify an author of a one document may be nested in a header of the document, while in another document the author may be identified in field be nested within the body of the document. Further, the fields in each documents may have a different name, e.g., "Author" in one document and "Creator" in another.

The ETL server maps fields of each input document to fields of a target format (e.g., Atom, RSS, or some other format). To do so, the ETL server evaluates a given document against a set of mapping rules associated with the target format. Each mapping rule specifies structural characteristics corresponding to a given field in the target format to identify within the input document. In one embodiment, the mapping rules may include NLP-based characteristics. For example, a rule for identifying an author field may define a lexical answer type (LAT) for a descriptor (e.g., an XML tag, JSON name) in the document. The LAT definition may specify a general type of person that is or is synonymous with the word "author."

Once mapping rules are defined, the ETL server parses the document to identify fields based on the mapping rules and associated characteristics. To do so, the ETL server uses NLP techniques to analyze metadata describing the structure of the document. That is, the structure of many documents can be expressed as a string. For example, the XML Path Language (XPath) provides a tree representation of tags in an XML document. The tree representation can further be expressed in a given syntax, such as "/parent tag/child tag/grandchild tag." An example XPath for a tag in the document might be expressed as "/doc/head/creator" or "/doc/head/title" for author and title tags, respectively. The ETL server can evaluate the XPath as a string, using NLP techniques, to identify whether the tags closely relate to the specified characteristics. For example, in the case of the previously mentioned mapping rule for an "Author" field, the ETL server may determine that a tag represented by "/doc/head/creator" corresponds to the Author field because "creator" is a type of person and is also synonymous with "author." Further, the ETL server may determine a score indicating a confidence that the field in the input document corresponds to the target field.

Once determined, the ETL server also evaluates the field value, i.e., the content provided by descriptor itself (e.g., within a tag), using NLP techniques. The ETL server does so to further determine whether the field in the input document actually corresponds to the desired field for the target format. Continuing the previous example of the author mapping rule, the ETL server may evaluate the identified field within the document to determine whether the field value resembles a name or a proper noun. Further, the ETL server may determine a score indicating a confidence that the text content within the descriptor corresponds to the kind of data expected to be in the descriptor. If the scores for the descriptor and the value exceed a specified threshold, the ETL server can map the field to a target field in a normalized document. Once the fields associated with the target format are mapped, the ETL server then ingests the normalized document into the target computer system for processing.

Techniques disclosed herein transform distinct input formats into a desired input format. Advantageously, using NLP techniques to evaluate textual and structural elements of input documents allows an ETL server to discover key structural elements in unknown file formats (e.g., JSON, CSV, custom XML schemas, etc). As a result, the ETL server can better classify the textual and structural elements of a given input document. Further, the techniques described do not require manual assessment of each individual document to discern where desired fields are located. Rather, the ETL server can automatically identify the desired fields in an input document using NLP relative to the mapping rules and associated characteristics.

Note, the following references the Atom Syndication Format as an example output format transformed from distinct formats of input documents. However, one of ordinary skill in the art will recognize that embodiments presented herein can transform the distinct formats into any target format, such as RSS, HTML, JSON, CSV, or some customized XML schema. Further, the following also describes embodiments relative to an ETL server ingesting medical documents (e.g., articles, research papers, textbooks, etc.) into a computer system for natural language processing. One of ordinary skill in the art will recognize that embodiments are applicable in any scenario related to creating an easily searchable knowledge base from a plurality of documents structured in disparate formats. For example, an ETL server can apply NLP techniques to legal documents (e.g., legal opinions, scholarly articles, blog posts) having different formats to transform the formats into a standardized format. Once transformed, the ETL server can ingest the documents (converted to the standardized format) into a computer system to build a knowledge base of legal information.

Figure 1:
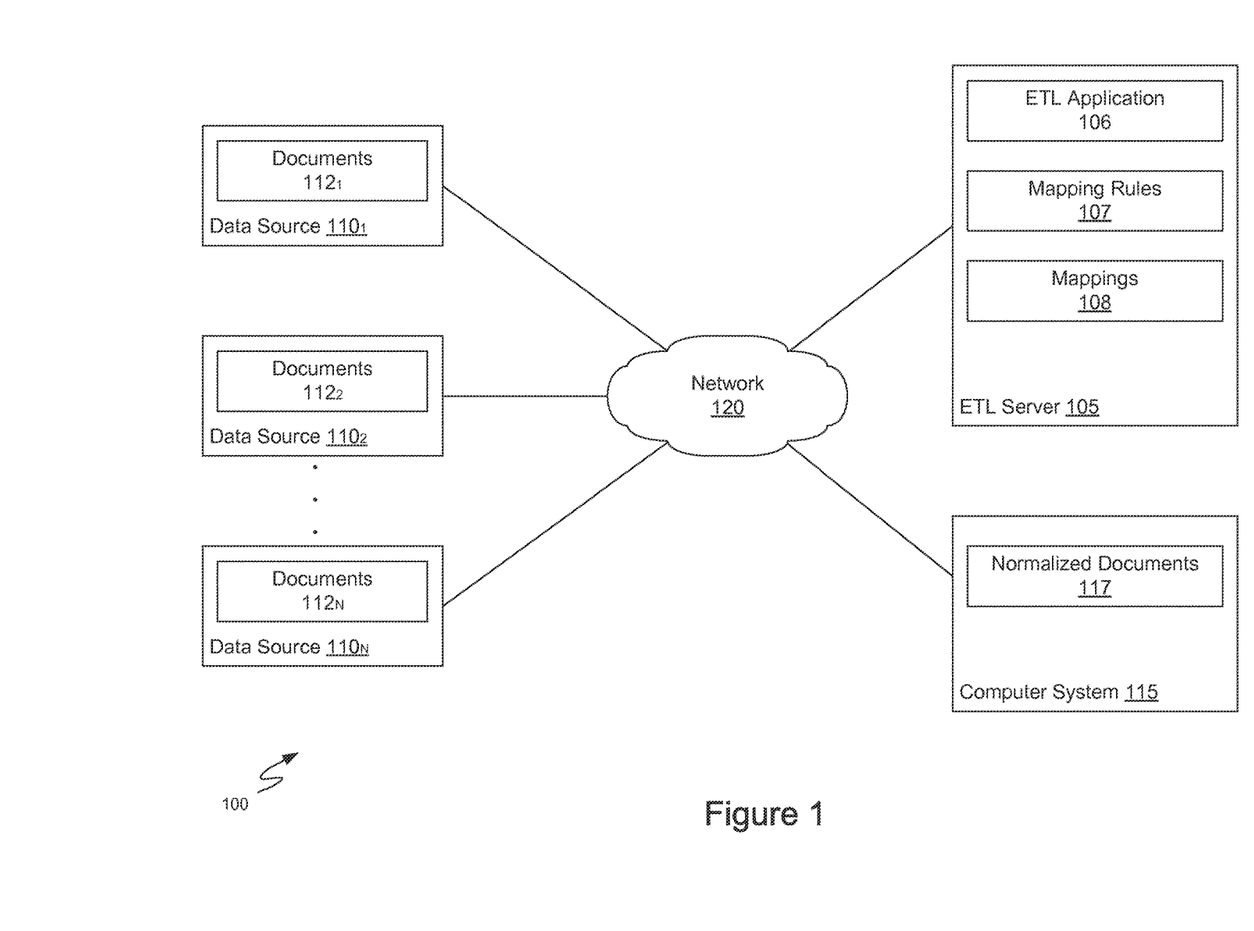
FIG. 1 illustrates an example computing environment, according to one embodiment.

FIG. 1 illustrates an example computing environment 100, according to one embodiment. As shown, the computing environment 100 includes an ETL server 105, multiple data sources $110_{1-N}$, and a computer system 115. The ETL server 105 may be a physical computing system or a virtual machine instance in a computing cloud. In one embodiment, an ETL application 106 executing on the ETL server 105 retrieves, via a network 120, documents $112_{1-N}$ from the data sources 110 to ingest into the computer system 115. The data sources 110 may be digital library archives, servers of research institutions, hospital databases, etc. At any rate, the data sources provide 110 documents $112_{1-N}$, which may be research papers, articles, texts, and the like. In one embodiment, the computer system 115 is a question answering (QA) system that generates a knowledge base of information provided in the documents $112_{1-N}$.

Further, the documents 112 may be structured differently from one another. That is, some of the documents 112 may be organized in various customized schema of the XML language, in HTML format, etc. In addition, the documents 112 may include information unnecessary for purposes of the computer system 115. For example, the computer system 115 may be configured to process author, title, and body information of each document $112_{1-N}$ but not bibliographical information included in the document $112_{1-N}$.

In one embodiment, prior to ingesting the documents $112_{1-N}$ into the computer system 115, the ETL application 106 transforms the format of each of the documents $112_{1-N}$ into a target format, e.g., into the Atom format. To do so, the ETL application 106 evaluates the structure and content of the documents 112 using NLP techniques, such as lexical analysis, to determine mappings 108 to the target format, i.e., which fields in each of the documents $112_{1-N}$ correspond to fields in the target format.

In one embodiment, the ETL application 106 determines the mappings 108 based on a set of mapping rules 107. The mapping rules 107 define desired fields (e.g., author, title, publishing date, body, etc.) to extract from the documents 112. Further, each mapping rule 107 defines structural and textual characteristics used to identify where a given field is located in a given document 112. For example, the mapping rule 107 for extracting author information may include certain characteristics for what a corresponding author descriptor (e.g., an XML/HTML tag, JSON name, CSV row, etc.) would resemble in a document. The mapping rule 107 may specify a lexical answer type (LAT) for the descriptor. The LAT may indicate that an author descriptor specifies a type of person. Further, the mapping rule 107 may specify other attributes regarding an author descriptor, such as the word being synonymous with the term "author." As another example, the mapping rule 107 for extracting publishing date information may specify attributes indicating a word that is synonymous with the term "create" or publish."

In one embodiment, the ETL application 106 converts the document 112 to the target format based on the mappings 108, which results in a corresponding normalized document 117. The ETL application 106 ingests the normalized document 117 into the computer system 115.

Figure 2:
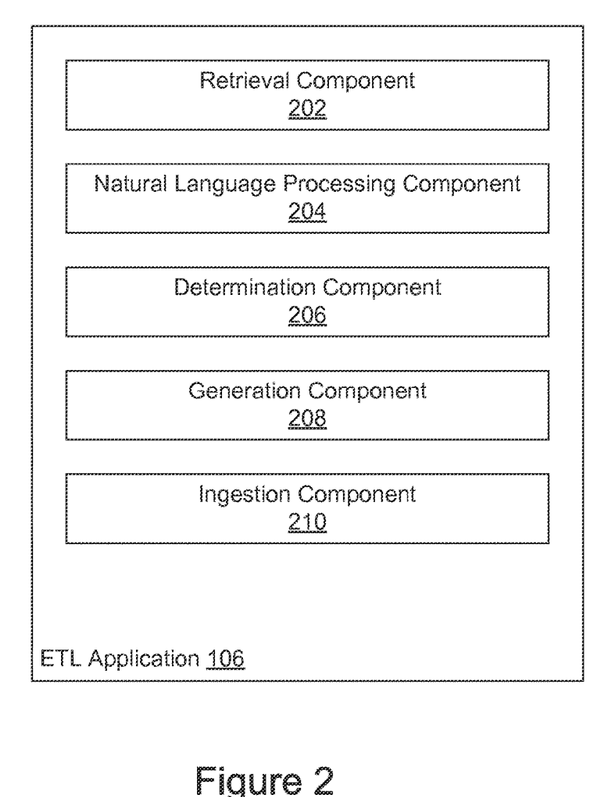
FIG. 2 further illustrates the extract, transform, and load (ETL) application described relative to FIG. 1, according to one embodiment.

FIG. 2 further illustrates the ETL application 106, according to one embodiment. As shown, the ETL application 106 further includes a retrieval component 202, a natural language processing (NLP) component 204, a determination component 206, a generation component 208, and an ingestion component 210.

In one embodiment, the retrieval component 202 obtains documents $112_{1-N}$ from the data sources $110_{1-N}$. The retrieval component 202 evaluates the structure of the document to identify field descriptor and text content within each descriptor. The retrieval component 202 may format each field descriptor into a string representing the path of the descriptor. Using an XML document as an example, an XPath for a tag labeled "creator" may be "/article/header/metadata/creatorList/creator." The NLP component 204 can analyze lexical and semantic attributes of the XPath to determine whether the tag corresponds to a field in the target format. As another example, a similar path for a JSON-formatted file may be "article.header.metadata.creatorList-.creator." In any case, the NLP component 204 analyzes a string representing the path of a given descriptor to identify matches to a field of a target format.

The NLP component 204 evaluates the descriptor and text content against the mapping rules 107. As stated, the mapping rules 107 are specified structural and textual characteristics used to identify where a given field for a target format might be located in a given document 112. For instance, the mapping rules 107 may specify attributes for each descriptor. For example, attributes for a title descriptor might describe a short phrase with a high incidence of capital letters. Further, the NLP component 204 may use a variety of NLP techniques to evaluate the descriptor and text of the document based on the rules 107. For example, the NLP component 204 may perform lexical analysis on the XPath of a given tag in an XML document to determine whether a mapping rule 107 applies to the tag. Further, the NLP component 204 evaluates the text content within a given descriptor using NLP techniques (e.g., using an English Slot Grammar parse and the like). The NLP component 204 does so to further evaluate whether the field of the document corresponds to the field in the target format.

In one embodiment, the determination component 206 generates descriptor scores indicating a confidence that a given descriptor corresponds to characteristics to a given mapping rule 107. A descriptor having a relatively high score for the mapping rule 107 indicates that the descriptor may correspond to the field associated with the rule. Further, the determination component 206 generates text content scores indicating a confidence that the text content within a given descriptor corresponds to characteristics of a given mapping rule 107. The determination component 206 does so to further determine that the field corresponds to a given field in the target format. The determination component 206 also does so to resolve ambiguity between two descriptors having similar descriptor scores.

In one embodiment, the determination component 206 evaluates the field descriptor and text content scores relative to each mapping rule 107. If a pair of scores relative to a given mapping rule 107 exceeds respective thresholds, then the determination component 206 generates a mapping 108 of the field of the input document 112 to the target field associated with that mapping rule 107. Further, in one embodiment, if the scores fall below the thresholds but are within a specified range the thresholds, the determination component 206 may flag the field to be verified manually.

In one embodiment, each mapping rule 107 specifies a weighting between the descriptor score and the text content score. For example, for the case of a publishing date, a date has a relatively small amount of date formats. Therefore, a mapping rule 107 for the publishing date might specify that a text content score has a larger weighting than a descriptor score. In practice, a 90% text score-to-10% descriptor score weighting has shown to be effective for the publishing date. As another example, in the case of an ID, the text content might not provide much useful information. That is, an ID usually comprises a single token (e.g., abc, abc123, 13244, abc-12-xyz, etc.). Therefore, in such a case, the corresponding descriptor might be of better use. Thus, a mapping rule 107 for the ID might specify that a descriptor score has a larger weighting than a text content score.

The generation component 208 transforms the input document 112 into a normalized document 117 based on the mappings 108 generated by the determination component 206. The generation component 208 may export the normalized document 117 or retain the document 117 in memory to preserve resources. In one embodiment, the ingestion component 210 sends the normalized document 117 to the computer system 115.

Figure 3:
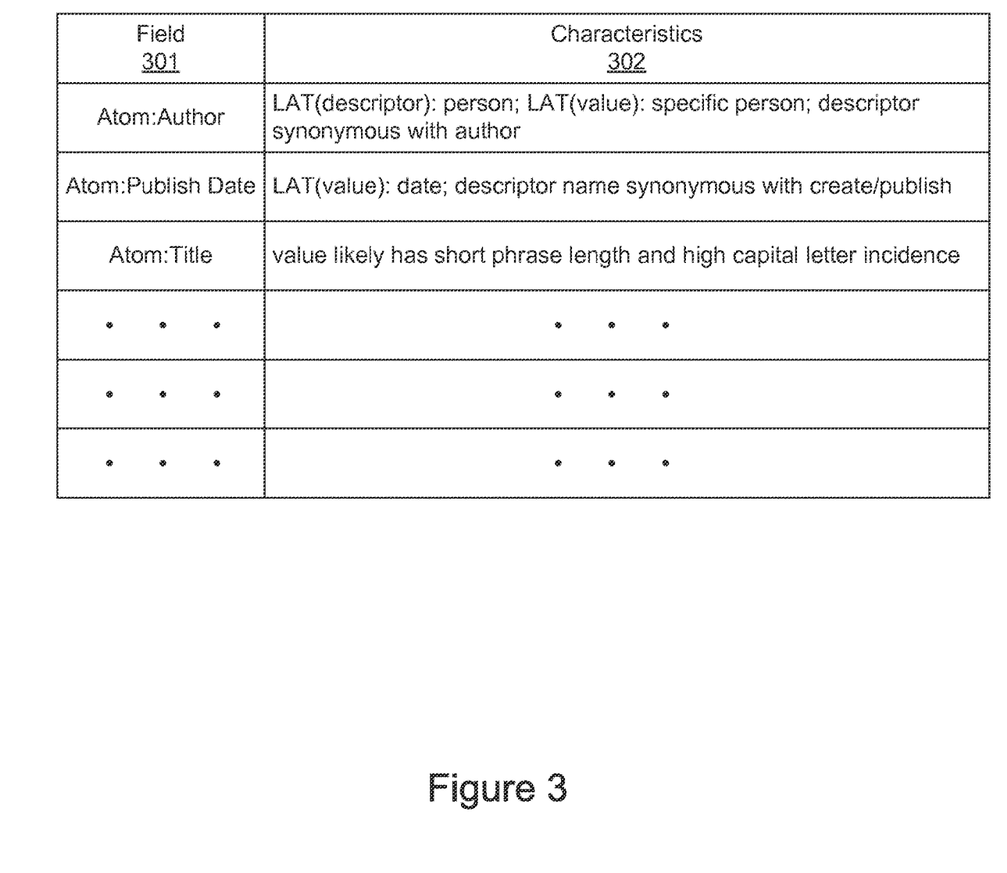
FIG. 3 illustrates an example of rule definitions for identifying fields to extract from documents, according to one embodiment.

FIG. 3 illustrates an example table of field characteristics for the mapping rules 107, according to one embodiment. As stated, each mapping rule 107 may specify linguistic (e.g., lexical, semantic, etc.) characteristics to identify when evaluating a descriptor (e.g., XML tags, JSON names, etc.) and text content of the descriptors in an input document. Such characteristics may include LATs for a given field that describe lexical traits to locate in a given descriptor or content. Note, the example table is provided for better understanding of characteristics that can be specified for a mapping rule 107. The actual implementation is not restricted to a table of fields and characteristics.

Illustratively, the table has a field column 301 and a characteristics column 302. Each row in the field column 301 specifies a selected target format (i.e., Atom) followed by a given field type (e.g., Author, Publish Date, Title, etc.). Specifically, each row in the field column 301 specifies a type of field for a corresponding mapping rule 107 to identify in a given input document. For example, consider the second row labeled "Atom:Publish Date." In this case, the NLP component 204 evaluates the document structure to identify where a publishing date field is located within the document 112. Advantageously, rather than manually identifying each field when parsing an individual document, the NLP component 204 can identify a particular field in multiple disparate documents.

Each row in the characteristics column 302 specifies lexical traits to locate in a descriptor and a value (i.e., the text content provided with the descriptor). For instance, continuing the previous example of the second row for identifying a publishing date field, the characteristics column 302 may include attributes for the descriptor name. In this case, the attributes specify that the name of the descriptor should be synonymous with the words "create" and "publish." Accordingly, when the NLP component 204 evaluates a given path (e.g., an XPath) in an input document 112, the NLP component 204 identifies whether the path includes such names. The determination component 206 may then generate a confidence score indicating the likelihood that the path corresponds to the field of the target format.

Further, continuing the example, the "Atom:Publish" characteristics also include a LAT for the value—in this case—a date. In this case, the NLP component 204 analyzes the text content nested within a given descriptor to determine whether the content corresponds or resembles a date (e.g., whether the content has month names, numbers that corresponds to a months, or whether the text is otherwise formatted like a date). Similar to the evaluated descriptor, the determination component 206 may also generate a confidence score indicating the likelihood that the content resembles a possible value of the target format field.

Figure 4:
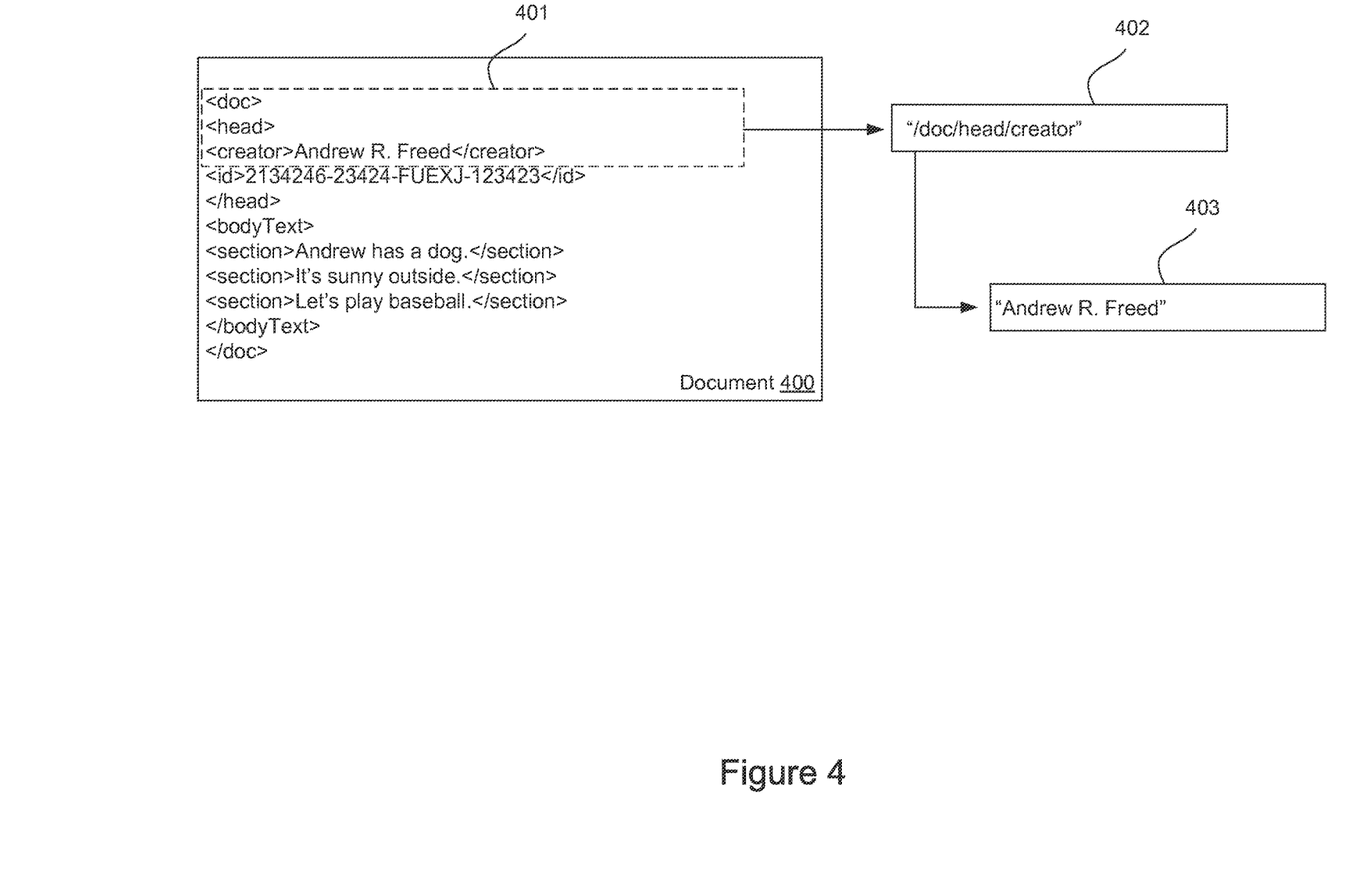
FIG. 4 illustrates an example document retrieved by an ETL server, according to one embodiment.

FIG. 4 illustrates an example document 400 retrieved by an ETL server, according to one embodiment. The ETL application 106 transforms the document 400 to a normalized document to ingest into the computer system 115. The document 400 is structured in a customized XML format, having various tags identifying a creator, ID, and text content. For example, in the dotted box 401, a "creator" tag is nested within a "doc" and a "head" tag. Further, the XPath of the "creator" tag may be expressed as "/doc/head/creator," as shown in box 402. Further, the tag value of the "creator" tag is "Andrew R. Freed," as shown in box 403.

Figure 5:
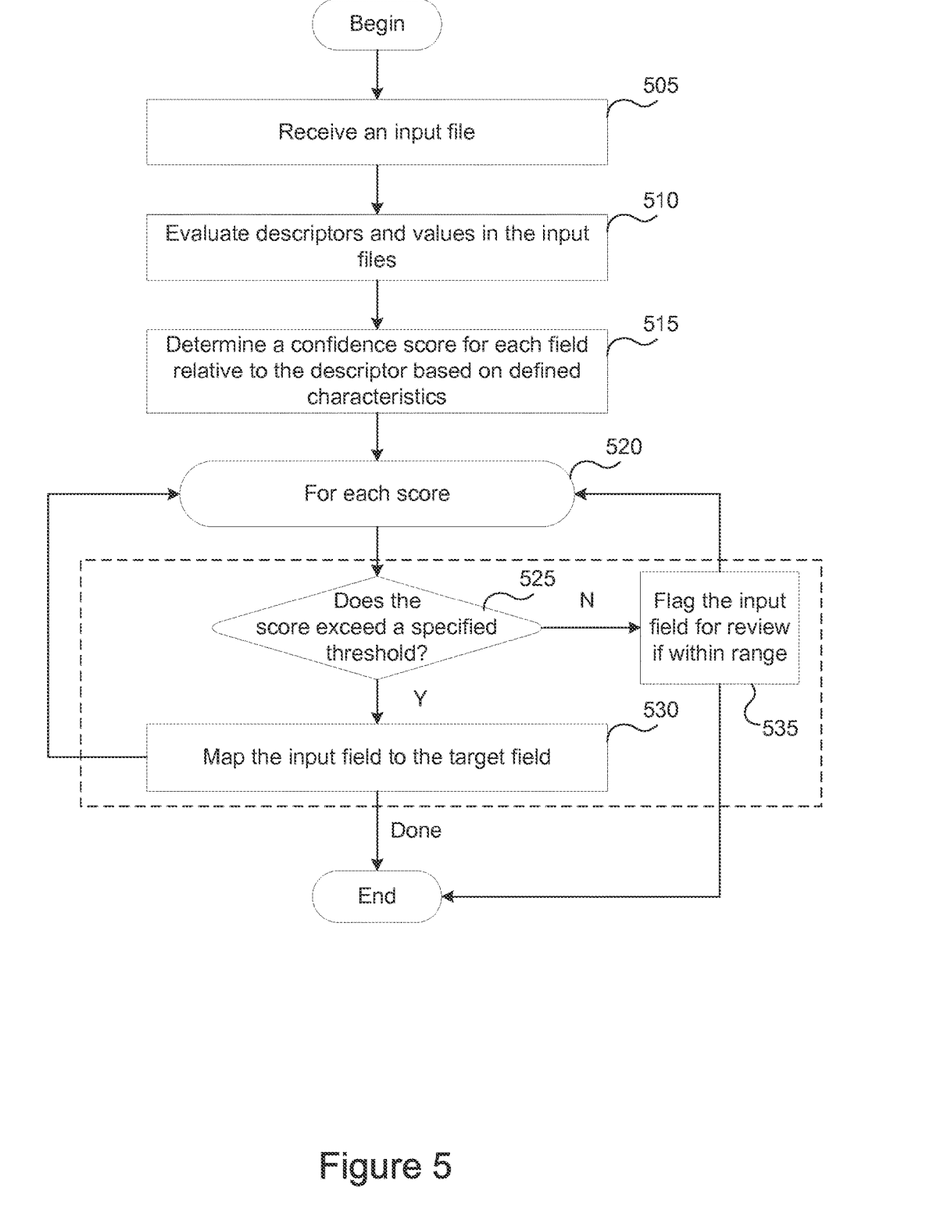
FIG. 5 illustrates a method for mapping fields of an input document having a distinct format to standardized fields, according to one embodiment.

FIG. 5 illustrates a method 500 for transforming an input document having a distinct format to a document having a normalized target format, according to one embodiment. As an example, assume that the target format is the Atom format, and that the mapping rule characteristics described relative to FIG. 3 apply.

At step 505, the retrieval component 202 obtains an input document from a data source. The document can be a structured, semi-structured, or unstructured text. For example, assume that the retrieval component 202 obtains the document 400 described relative to FIG. 4. The retrieval component 202 may format each tag in the document 400 to an XPath (e.g., XPath 402).

At step 510, the NLP component 204 evaluates each descriptor and text content against the mapping rules 107. As stated, each mapping rule 107 specifies characteristics to identify with regard to a particular field in a target format. For example, the NLP component 204 may evaluate the XPath 402 labeled "/doc/head/creator" against each of the mapping rules 107. The NLP component 204 can perform an English Slot Grammar parse to identify tokens within the string, such as "doc," "head," and "creator." The NLP component 204 can then perform lexical analysis on each of the tokens to determine whether any of the tokens apply to the LATs described in the mapping rules 107. For example, assume that the NLP component 204 evaluates the XPath 402 (i.e., "/doc/head/creator") relative to the Atom:Author mapping rule shown in FIG. 3. Illustratively, the LAT for the descriptor specifies a generic type of person. The attributes also specify that the descriptor is likely synonymous with author. In such a case, the NLP component 204 may determine that the term "creator" in the XPath conforms with the characteristics. Continuing the previous example, the NLP component 204 also evaluates the text content within the tag, i.e., text content 403 for "Andrew R. Freed." The NLP component 204 may determine that the string confirms with characteristics for the tag value, i.e., words that resemble a name.

At step 515, the determination component 206 generates a confidence score for each descriptor and text content evaluated by the NLP component 204. Continuing the previous example, because the term "creator" in the XPath likely conforms with the characteristics in the author mapping rule, then the determination component 206 may generate a high score for the tag. Likewise, the determination component 206 may generate a high score for the text content because the string "Andrew R. Freed" resembles a name.

In one embodiment, the determination component 206 may weight and converge the generated description score and text score pairs. Doing so allows the determination component 206 to more effectively disambiguate fields. Continuing the example of the "/doc/head/creator" XPath, although the determination component 206 may generate a score for such a tag highly with regard to the author mapping rule, the determination component 206 might also generate a high score for the tag with regard to the publishing date mapping rule, because "creator" closely resembles the term "create" specified in the attributes. On the other hand, the determination component 206 may generate a relatively high score for the tag value "Andrew R. Freed" relative to the author mapping rule but generate a relatively low score of the same tag value relative to the publishing date mapping rule. Further, the author mapping rule may place greater weight on the tag name than the tag value, while the publishing date mapping rule may place greater weight on the tag value than the tag name. As a result, when the scores of each pair converge, the score for the author mapping rule may be greater than the score for the publishing date mapping rule.

The generation component 208 performs the following steps for each score generated (at step 520). At step 525, the generation component 208 determines whether the score exceeds a specified threshold. If so, then the generation component 208 maps the field associated with the score to the field of the target format (at step 530). If not, the generation component 208 disregards the field. However, if the score is within a specified range of the threshold, then the generation component 208 can flag the field for manual verification.

Once the mappings 108 have been determined for the input document, the ingestion component 210 can ingest a normalized document into the target system.

Figure 6:
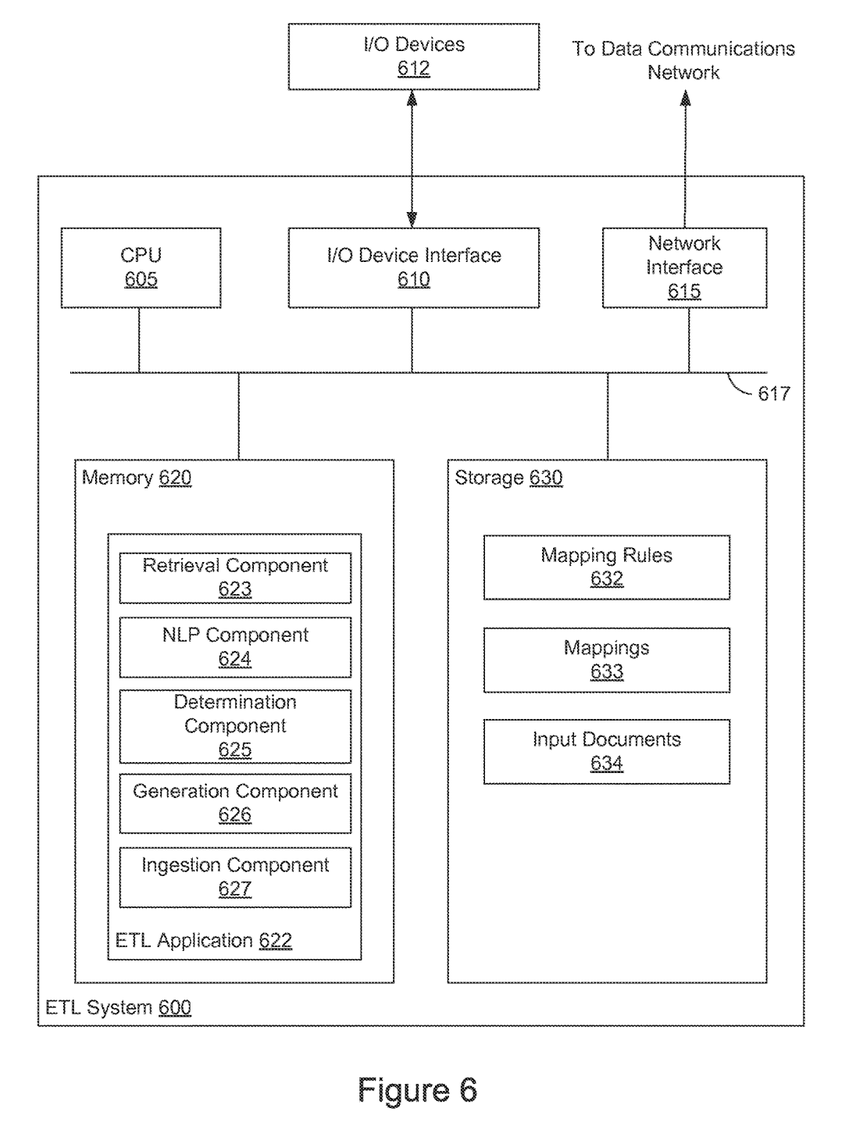
FIG. 6 illustrates an example ETL server configured to transform a distinct document format into a standard format, according to one embodiment.

FIG. 6 illustrates an example ETL system 600 configured to transform a distinct document format into a normalized format, according to one embodiment. As shown, the ETL system 600 includes, without limitation, a central processing unit (CPU) 605, a network interface 615, a memory 620, and storage 630, each connected to a bus 617. The ETL system 600 may also include an I/O device interface 610 connecting I/O devices 612 (e.g., keyboard, display and mouse devices) to the ETL system 600. Further, in context of this disclosure, the computing elements shown in the ETL system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an ETL application 622. And storage 630 includes mapping rules 632, mappings 633, and input documents 634. The ETL application 622 retrieves input documents 634 from data sources and ingests the input documents 634 into a target computer system. Each of the input documents 634 may have disparate formats, such as XML, HTML, etc. The ETL application 622 transforms the formats of each of the input documents 634 to a standardized format prior to ingesting the documents into the target system.

The ETL application 622 further includes a retrieval component 623, an NLP component 624, a determination component 625, a generation component 626, and an ingestion component 627. The retrieval component 623 obtains the input documents 634 and identifies field descriptors and text content within each descriptor. The NLP component 624 analyzes lexical and semantic attributes of the descriptors and text content against the mapping rules 632. The determination component 625 generates a confidence score indicating a likelihood that a given field in the input document corresponds to a field in the specified target format. If an input field has a confidence score that exceeds a threshold for a mapping rule associated with a given target field, the generation component 626 creates a mapping 633 from the input field to that target field. The generation component 626 transforms the input document into a normalized document based on the generated mappings 633. The ingestion component 626 sends the normalized document to the target computer system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the ETL application 106 or related data available in the cloud. For example, the ETL application 106 could execute on a computing system in the cloud and transform the formats of input documents to a specified normalized format. In such a case, the ETL application 106 could generate normalized documents and store the normalized documents at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for mapping fields of an input document according to a first format, the method comprising:
   identifying, by execution of one or more processors, a plurality of first fields in the input document, wherein each first field includes an input descriptor and text content associated with the input descriptor;
   identifying, by execution of the one or more processors, a plurality of mapping rules wherein each mapping rule specifies characteristics associated with a target field in a target format, wherein the characteristics comprise a target descriptor and a lexical answer type identifying lexical traits to locate in the plurality of first fields of the input document;
   for each first field:
      evaluating, via one or more natural language processing techniques, semantic properties of the input descriptor against the plurality of mapping rules to determine whether the input descriptor is consistent with one of the target fields;
      evaluating, via one or more natural language processing techniques, semantic properties of the text content against the plurality of mapping rules to determine whether the text content is consistent with one of the target fields, based on the lexical answer type associated with the target field, and wherein evaluating further comprises:
         determining, for each mapping rule, a descriptor score associated with the input descriptor and a content score associated with the text content, the descriptor score and the content score indicating a likelihood that the respective input descriptor and text content match the characteristics specified in the mapping rule; and
         converging the descriptor score and the content score into a consolidated score based on a weighting between the descriptor score and the content score specified by the associated mapping rule;
      determining, based on evaluating the semantic properties of the input descriptor and the text content against the plurality of mapping rules, that the first field corresponds to a target field; and
      upon determining that the first field corresponds to the target field, defining a mapping from the first field to the corresponding target field;
   generating a normalized document by mapping the text content of each first field to the respective corresponding target field; and
   sending the generated normalized document to an extract-transform-load (ETL) system.

2. The method of claim 1, further comprising, converting the first format of the input document into the target format based on the defined mappings.

3. The method of claim 1, wherein the target format is an Atom syndication format.

4. The method of claim 1, wherein determining that the first field corresponds to a target field comprises:
   determining whether the consolidated score for the mapping rule associated with one of the target fields exceeds a specified threshold.

* * * * *